United States Patent
Ueda et al.

(10) Patent No.: US 11,402,135 B2
(45) Date of Patent: Aug. 2, 2022

(54) FLUID SUPPLY APPARATUS

(71) Applicant: SHINWA CONTROLS CO., LTD, Kawasaki (JP)

(72) Inventors: Teiichirou Ueda, Kawasaki (JP); Yasuhiro Naohara, Kawasaki (JP)

(73) Assignee: Shinwa Controls Co., Ltd, Kawasaki (JP)

( * ) Notice: Subject to any disclaimer, the term of this patent is extended or adjusted under 35 U.S.C. 154(b) by 203 days.

(21) Appl. No.: 16/642,228

(22) PCT Filed: Aug. 29, 2018

(86) PCT No.: PCT/JP2018/031918
§ 371 (c)(1),
(2) Date: Feb. 26, 2020

(87) PCT Pub. No.: WO2019/049744
PCT Pub. Date: Mar. 14, 2019

(65) Prior Publication Data
US 2020/0355407 A1    Nov. 12, 2020

(30) Foreign Application Priority Data
Sep. 6, 2017   (JP) .............................. JP2017-171252

(51) Int. Cl.
*F25B 9/00*   (2006.01)
*F25B 1/00*   (2006.01)
(Continued)

(52) U.S. Cl.
CPC ................ *F25B 9/008* (2013.01); *F25B 1/00* (2013.01); *F25B 9/10* (2013.01); *F25B 2309/06* (2013.01);
(Continued)

(58) Field of Classification Search
CPC .... F25B 9/008; F25B 1/00; F25B 9/10; F25B 2309/06; F25B 2339/047; F25B 2309/061;
(Continued)

(56) References Cited

U.S. PATENT DOCUMENTS

| 5,606,724 A | 2/1997 | Wai et al. |
| 7,992,397 B2 | 8/2011 | Nemoto et al. |
| 8,496,882 B2 * | 7/2013 | Matthews ................ B01J 8/003 422/138 |

FOREIGN PATENT DOCUMENTS

| JP | H06-189732 A1 | 7/1994 |
| JP | 2001-518139 A1 | 10/2001 |

(Continued)

OTHER PUBLICATIONS

International Search Report and Written Opinion (Application No. PCT/JP2018/031918) dated Dec. 4, 2018.
(Continued)

*Primary Examiner* — Ana M Vazquez
(74) *Attorney, Agent, or Firm* — Burr & Brown, PLLC (57) ABSTRACT

In a first fluid circulation device, a heat exchanger, a tank that stores a first fluid liquefied by the heat exchanger, a first fluid pump that pumps the first fluid stored in the tank, a heater that heats the first fluid pumped from the first fluid pump, and a first fluid supply unit to which the first fluid is supplied from the heater are connected by a first pipe. A second fluid circulation device includes a cooler that cools a second fluid, causes the second fluid having been cooled by the cooler to circulate through a second pipe, and returns the second fluid to the cooler. The second pipe is connected to the heat exchanger and is connected to the tank and the first fluid pump, and the second fluid cools the first fluid in the heat exchanger, the tank, and the first fluid pump.

7 Claims, 6 Drawing Sheets

(51) Int. Cl.
*F25B 9/10* (2006.01)
*F25D 17/02* (2006.01)
*F28D 1/06* (2006.01)

(52) U.S. Cl.
CPC ........ *F25B 2339/047* (2013.01); *F25D 17/02* (2013.01); *F28D 1/06* (2013.01)

(58) Field of Classification Search
CPC . C01B 32/50; F25D 17/02; F28D 1/06; F04B 53/08; F04B 53/16; F04B 49/00
See application file for complete search history.

(56) References Cited

FOREIGN PATENT DOCUMENTS

| | | |
|---|---|---|
| JP | 2008-209111 A1 | 9/2008 |
| JP | 2014-101241 A1 | 6/2014 |
| KR | 2016-0059730 A | 5/2016 |

OTHER PUBLICATIONS

Japanese Office Action (Application No. 2017-171252) dated Mar. 2, 2018 (with English translation).
Korean Office Action (with English translation), Korean Application No. 2020-7000793, dated Feb. 25, 2022 (11 pages).

* cited by examiner

FLUID SUPPLY APPARATUS

BACKGROUND OF THE INVENTION

1. Field of the Invention

The present invention relates to a fluid supply apparatus suitable for use in supplying a fluid such as a supercritical fluid.

2. Description of Related Art

Examples of fluids that require precise temperature control to a desired temperature include brine for cooling a stage holding a wafer, supercritical fluids expected to be used in various fields such as cleaning, and the like. An example of the supercritical fluid includes a supercritical carbon dioxide fluid that can be generated by boosting the pressure of liquid carbon dioxide by a pump and then heating the carbon dioxide by a heater. As an apparatus for generating such a supercritical carbon dioxide fluid, a conventional circulation-type generator is known. In general, the apparatus includes a cooling unit that cools and liquefies a supercritical carbon dioxide fluid after cleaning or the like, and a tank that stores the liquefied carbon dioxide, in addition to a pump and a heater. Thus, the liquefied carbon dioxide is boosted in pressure and heated again by the pump and heater to repeatedly generate supercritical carbon dioxide fluid (e.g., JP 2014-101241 A).

It is known that the solubility of the supercritical carbon dioxide fluid as described above increases or decreases according to a change in density and the density changes according to temperature. Therefore, the temperature of the supercritical carbon dioxide fluid is required to be controlled highly accurately to obtain a desired solubility. At this time, it is important to maintain the temperature of carbon dioxide being liquefied before heating or boosting, at a desired temperature.

SUMMARY OF THE INVENTION

Technical Problem

The present invention has been made in view of the above circumstances, and an object of the present invention is to provide a fluid supply apparatus that is configured to stably maintain the temperature of a fluid at a desired temperature.

Solution to Problem

A fluid supply apparatus according to the present invention includes a first fluid circulation device and a second fluid circulation device, the first fluid circulation device including a heat exchanger that cools and liquefies a first fluid, a tank that stores the first fluid liquefied by the heat exchanger, a pump that pumps the first fluid stored in the tank, a heater that heats the first fluid pumped from the pump, a first fluid supply unit that receives the first fluid supplied from the heater, and a first pipe that connects the heat exchanger, tank, pump, heater, and first fluid supply unit to each other, "in which the first fluid having been supplied to the first fluid supply unit is caused to flow out to the heat exchanger" or "in which flow of the first fluid is switchable between a state in which the first fluid is supplied from the heater to the first fluid supply unit and a state in which the heater causes the first fluid to flow out to the heat exchanger with no supply of the first fluid from the heater to the first fluid supply unit; and the second fluid circulation device including a cooler that cools a second fluid", and a second pipe that causes the second fluid having been cooled by the cooler to circulate and returns the second fluid to the cooler, in which the second pipe of the second fluid circulation device is connected to the heat exchanger and is connected to at least one of the tank and the pump, and the second fluid circulation device causes the second fluid and the first fluid to exchange heat with each other in the heat exchanger to cool the first fluid and causes the second fluid and the first fluid to exchange heat with each other in at least one of the tank and the pump to cool the first fluid.

According to the fluid supply apparatus according to the present invention, even if the temperature of the first fluid having been cooled by the second fluid in the heat exchanger rises before reaching the tank or the pump, the temperature rise is suppressed due to cooling by the second fluid in the tank and/or the pump. Thereby, the temperature of fluid (the first fluid) can be stably maintained at a desired temperature, particularly between the pump and the heater.

The second pipe may cause the second fluid to circulate through the tank or the pump and the heat exchanger in this order.

This configuration ensures a high refrigerating capacity of the second fluid as much as possible at a position near the heater, and the temperature of the first fluid is readily controlled to a desired temperature at which the first fluid is desirably supplied to the heater.

Furthermore, the second pipe may cause the second fluid to circulate through the pump, the tank, and the heat exchanger in this order.

This configuration ensures a high refrigerating capacity of the second fluid as much as possible at a position near the heater, and therefore, the temperature of the first fluid is readily controlled to a desired temperature at which the first fluid is desirably supplied to the heater, and increase in target portions for cooling improves stability in temperature control.

Still furthermore, the second pipe may include a pump connection portion connected to the pump so as to cool the first fluid by the second fluid in the pump, and a pump bypass portion bypassing the pump connection portion to send the second fluid downstream without circulating the second fluid through the pump.

According to this configuration, provision of an on-off valve or a flow control valve in the pump connection portion and/or the pump bypass portion enables adjustment of presence/absence of cooling the pump or refrigerating capacity to the pump.

Still furthermore, the pump may include a case body and a pump cover mounted in close contact with the case body, and the pump cover may include a cooling jacket so that the second pipe is connected to the cooling jacket of the pump cover.

This configuration enables to readily suppress the temperature of the first fluid from rising due to heat generated by a drive source of the pump.

Still furthermore, the tank may include a tank body and a tank cover that is mounted in close contact with the tank body, and the tank cover may include a cooling jacket so that the second pipe is connected to the cooling jacket of the tank cover.

This configuration enables to readily cool the first fluid in the tank.

Still furthermore, the first fluid is carbon dioxide, and the first liquid circulation device may be configured to boost the pressure of the first fluid by the pump and to heat the first fluid by the heater, generating supercritical carbon dioxide fluid.

This configuration enables to stably generate the supercritical carbon dioxide fluid.

Advantageous Effects of Invention

According to the present invention, the temperature of fluid can be stably maintained at a desired temperature.

DETAILED DESCRIPTION OF THE INVENTION

Hereinafter, embodiments of the present invention will be described in detail with reference to the accompanying drawings.

First Embodiment

Figure 1:
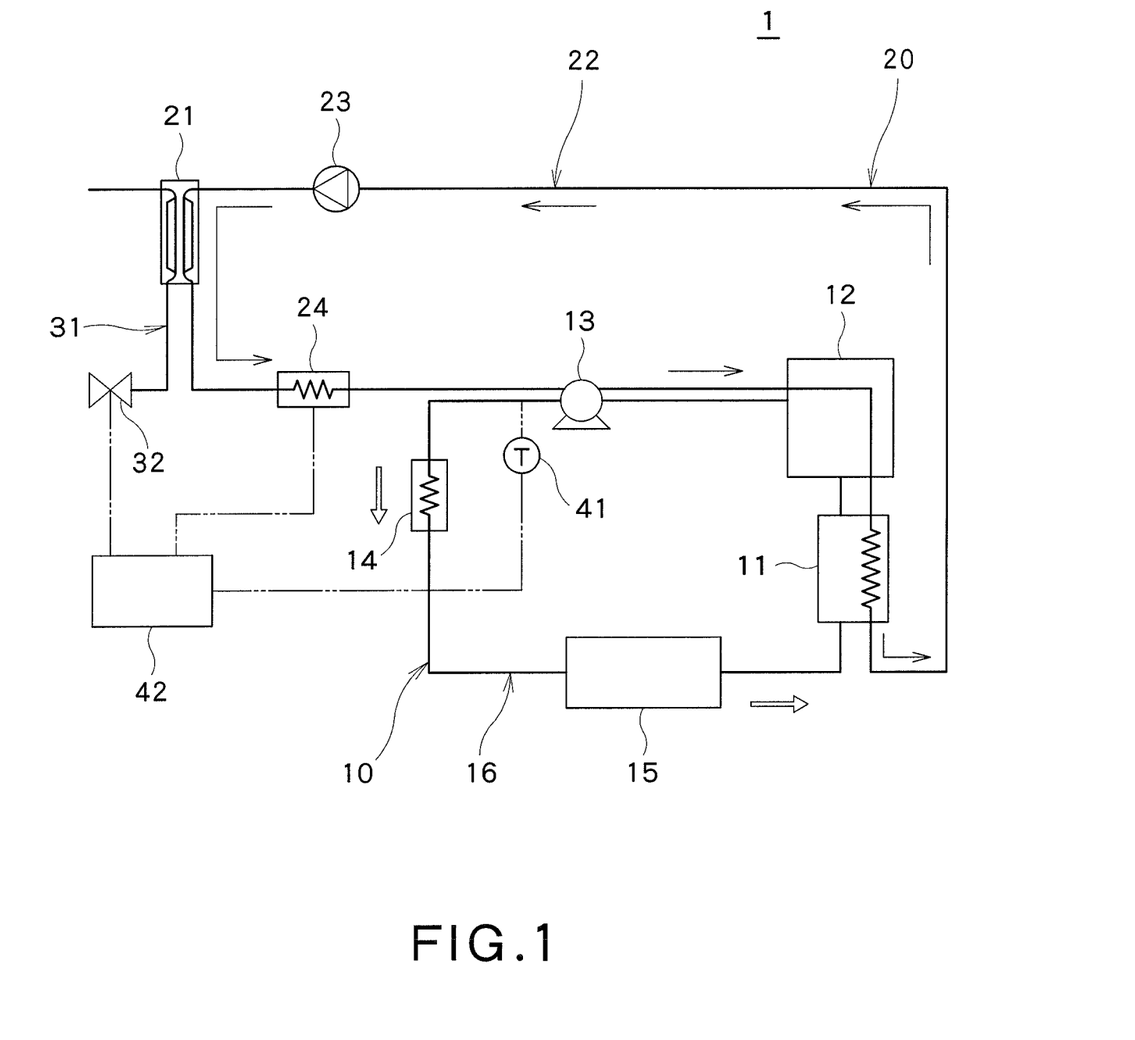
FIG. 1 is a schematic diagram of a fluid supply apparatus according to a first embodiment of the present invention.

FIG. 1 is a schematic diagram of a fluid supply apparatus 1 according to a first embodiment of the present invention. As an example, the fluid supply apparatus 1 according to the present embodiment is configured as an apparatus that generates and supplies a supercritical carbon dioxide fluid. As illustrated in FIG. 1, the fluid supply apparatus 1 includes a first fluid circulation device 10 that circulates carbon dioxide and a second fluid circulation device 20 that circulates a refrigerant for cooling the carbon dioxide circulated by the first fluid circulation device 10.

The carbon dioxide circulated by the first fluid circulation device 10 corresponds to the first fluid described in the present invention, and the refrigerant circulated by the second fluid circulation device 20 corresponds to the second fluid described in the present invention. Note that fluid circulated by the first fluid circulation device 10 is not limited to carbon dioxide and may be brine or the like. Furthermore, the refrigerant circulated by the second fluid circulation device 20 is an aqueous ethylene glycol solution but is not limited to this, and the refrigerant may be another alcohol-based antifreeze, fluorine-based refrigerant, or the like.

The first fluid circulation device 10 includes a heat exchanger 11 that functions as a condenser to cool and liquefy carbon dioxide, a tank 12 that stores the carbon dioxide having been cooled and liquefied by the heat exchanger 11, a first fluid pump 13 that pumps the liquefied carbon dioxide stored in the tank 12 and boosts the pressure of the liquefied carbon dioxide, a heater 14 that heats the liquified carbon dioxide having pumped from the first fluid pump 13 and having a boosted pressure to obtain supercritical carbon dioxide fluid, a first fluid supply unit 15 that receives the supercritical carbon dioxide fluid supplied from the heater 14, and a first pipe 16 that includes a plurality of pipes and connects the heat exchanger 11, the tank 12, the first fluid pump 13, the heater 14, and the first fluid supply unit 15.

The first fluid supply unit 15 and the heat exchanger 11 are connected to each other via part of the first pipe 16, and the first fluid supply unit 15 causes supplied supercritical carbon dioxide fluid that has been used for a predetermined purpose to flow out to the heat exchanger 11. The predetermined purpose described above may be, for example, washing or drying. That is, the first fluid supply unit 15 may be, for example, a cleaning tank used for cleaning with the supercritical carbon dioxide fluid or may be a container, a chamber, or the like used for drying with the supercritical carbon dioxide fluid.

Furthermore, the second fluid circulation device 20 includes a cooler 21 that cools the refrigerant and is configured to cause, for example, a second pipe 22 including a plurality of tube bodies to circulate the refrigerant having been cooled by the cooler 21, returning the refrigerant to the cooler 21. The cooler 21 illustrated is a heat exchanger, and the refrigerant circulated in the cooler 21 is cooled by another refrigerant separately supplied from an external device. Such another refrigerant may be, for example, a refrigerant circulating in a refrigerator.

Note that in FIG. 1, reference numeral 31 denotes a refrigerant pipe that causes another refrigerant for cooling the refrigerant circulated by the second fluid circulation device 20 to circulate, and the refrigerant pipe 31 is connected to the cooler 21. Furthermore, the refrigerant pipe 31 is provided with a flow control valve 32 that adjusts the flow rate of another refrigerant caused to flow into the cooler 21. In the present embodiment, adjustment of opening of the flow control valve 32 enables adjustment of the temperature of the refrigerant circulated by the second fluid circulation device 20.

The second pipe 22 is provided with a second fluid pump 23 that generates a driving force causing the refrigerant to circulate therethrough and a refrigerant heater 24 that heats the refrigerant. In the present embodiment, the refrigerant discharged from the second fluid pump 23 is circulated through the cooler 21 and the refrigerant heater 24 in this order in a direction indicated by an arrow in the figure.

Here, the second pipe 22 of the second fluid circulation device 20 according to the present embodiment is connected to the heat exchanger 11, tank 12, and first fluid pump 13 of the first fluid circulation device 10 at a portion downstream from the refrigerant heater 24 and upstream from the second fluid pump 23 (portion downstream and upstream from the cooler 21). Thereby, in the present embodiment, the second fluid circulation device 20 causes the refrigerant and carbon dioxide (mainly supercritical carbon dioxide fluid in this example) to exchange heat therebetween in the heat exchanger 11, cooling and liquefying the supercritical carbon dioxide fluid and also causes the refrigerant and carbon dioxide (mainly liquefied carbon dioxide in this example) to exchange heat therebetween in the tank 12 and the first fluid pump 13, cooling the supercritical carbon dioxide fluid.

Figure 2:
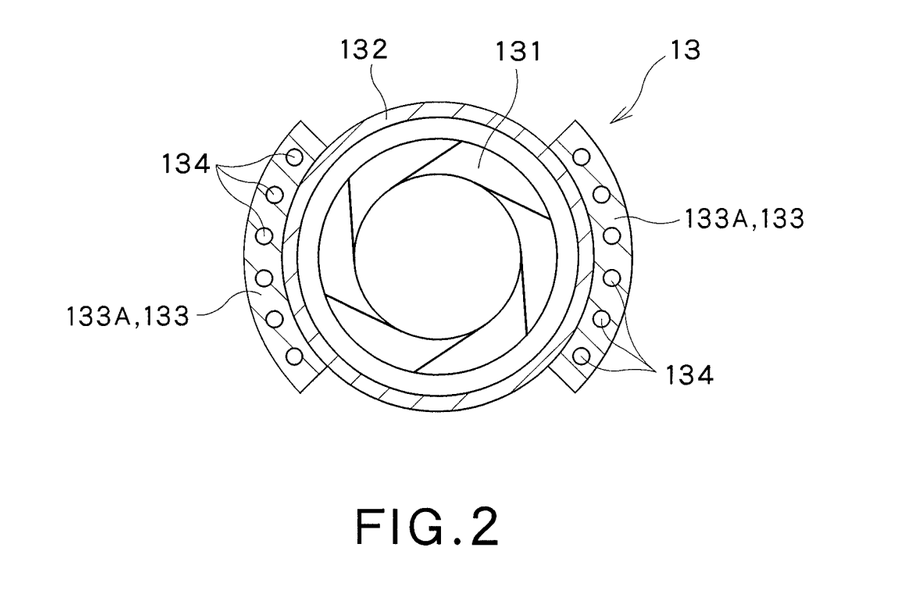
FIG. 2 is a schematic cross-sectional view of a pump of a first fluid circulation device in the fluid supply apparatus illustrated in FIG. 1.

FIG. 2 is a schematic cross-sectional view of the first fluid pump 13, illustrating a connection mode between the first fluid pump 13 and the second pipe 22. The first fluid pump 13 includes an impeller 131 rotated by a motor, which is not shown, a case body 132 that stores the impeller 131 as a drive unit and causes carbon dioxide fluid to flows in and out according to the drive of the drive unit, and a pump cover 133 removably mounted in close contact with the case body 132, the pump cover 133 including a plurality of cooling jackets 134. Here, the second pipe 22 is connected to the cooling jackets 134 of the pump cover 133. Thus, the refrigerant supplied from the second pipe 22 to the cooling jackets 134 will cool liquefied carbon dioxide inside the case body 132 through the cooling jackets 134 and the case body 132.

Furthermore, in the present embodiment, the case body 132 has a cylindrical shape, and the pump cover 133 includes a plurality of cover elements 133A divided in a circumferential direction of the case body 132. Each of the cover elements 133A has cooling jackets 134 and is formed in an arcuate shape in conformity with an outer surface of the case body 132. The case body 132 including a discharge side flow path for liquefied carbon dioxide, a motor mounting portion, and the like has a complicated shape, but in the present embodiment, use of the divided cover elements 133A enables efficient and compact mounting of the pump cover 133 to the case body 132 while avoiding interference with the discharge side flow path, the motor mounting portion, and the like. Note that the material of the pump cover 133 is not particularly limited, but a material having high thermal conductivity is preferably employed.

Furthermore, in the present embodiment, as the first fluid pump 13, a pump of a type having the impeller 131 is exemplified, but the first fluid pump 13 may include a diaphragm pump, a vane pump, a gear pump, or the like. In a case where the first fluid pump 13 includes a diaphragm pump, a diaphragm as the drive unit is mounted to the case body 132. At this time, the pump cover 133 may be mounted to an outer surface of the case body 132 so as to avoid the diaphragm.

Figure 3:
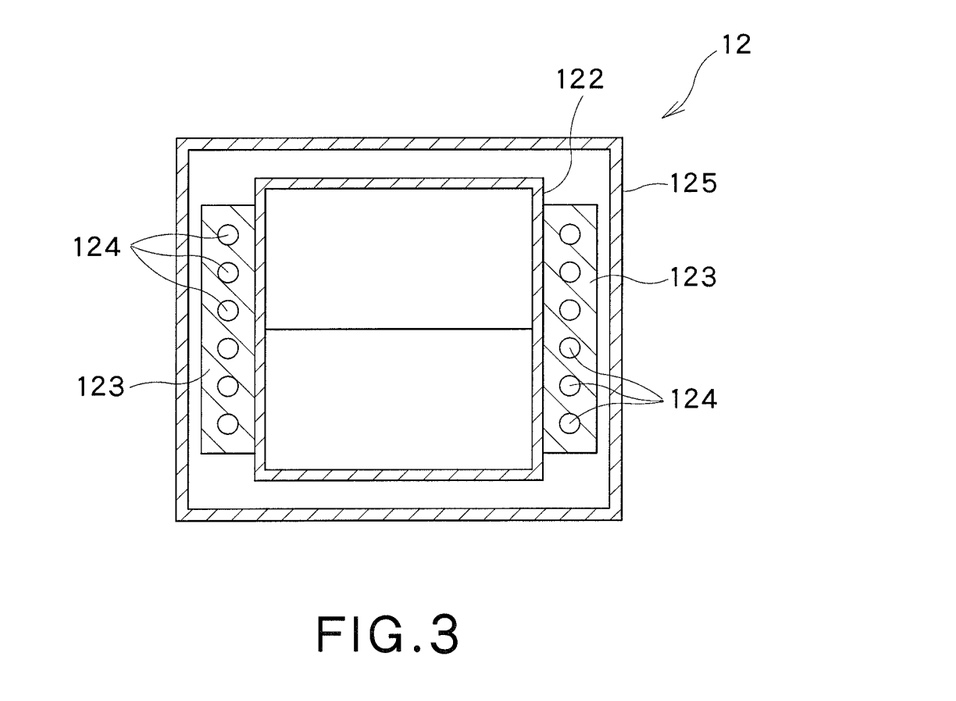
FIG. 3 is a schematic cross-sectional view of a tank of the first fluid circulation device in the fluid supply apparatus illustrated in FIG. 1.

Furthermore, FIG. 3 is a schematic cross-sectional view of the tank 12, illustrating a connection mode between the tank 12 and the second pipe 22. The tank 12 includes a tank body 122 that stores liquefied carbon dioxide, a tank cover 123 removably mounted in close contact with the tank body 122, and a heat insulating case 125 that integrally covers the tank body 122 and the tank cover 123, and a cooling jacket 124 is formed in the tank cover 123. Here, the second pipe 22 is connected to a plurality of the cooling jackets 124 of the tank cover 123, and thereby the refrigerant supplied from the second pipe 22 to the cooling jackets 124 will cool the liquefied carbon dioxide in the tank body 122 through the cooling jackets 124 and the tank body 122.

In the present embodiment, the tank body 122 and the tank cover 123 are covered with the heat insulating case 125, and thus a temperature rise of the refrigerant supplied to the cooling jacket 124 is suppressed. Such a heat insulating case 125 may have a heat insulating material such as urethane. The material of the tank cover 123 is not particularly limited, but a material having high thermal conductivity is preferably employed.

Returning to FIG. 1 again, the fluid supply apparatus 1 according to the present embodiment includes a controller 42 that adjusts the opening of the flow control valve 32 in the refrigerant pipe 31 and a heating amount of the refrigerant heater 24 on the basis of a result of the detection result by a temperature sensor 41 that detects the temperature of the liquefied carbon dioxide in a portion downstream from the first fluid pump 13 and upstream from the heater 14 in the first pipe 16. In this case, the controller 42 will adjust the refrigerating capacity of the refrigerant according to the temperature of the liquefied carbon dioxide immediately before reaching a position where the liquefied carbon dioxide is supplied to the heater 14. Thereby, in this embodiment, it becomes possible to control the temperature of the liquefied carbon dioxide supplied to the heater 14 to a desired temperature in a simple manner.

In the fluid supply apparatus 1 according to the present embodiment described above, even if the carbon dioxide cooled by the refrigerant in the heat exchanger 11 rises in temperature before reaching the tank 12 or the first fluid pump 13, the temperature rise is suppressed by cooling with the refrigerant in the tank 12 and the first fluid pump 13. Accordingly, the temperature of the fluid (carbon dioxide) can be stably maintained at a desired temperature, particularly between the first fluid pump 13 and the heater 14.

Furthermore, in the present embodiment, the second pipe 22 causes the refrigerant to circulate through the first fluid pump 13, the tank 12, and the heat exchanger 11 in this order. Since the refrigerating capacity of the refrigerant can be thereby ensured as much as possible at a position near the heater 14, the temperature of the carbon dioxide is readily controlled to a desired temperature at which the carbon dioxide is desirably supplied to the heater 14.

Furthermore, the first fluid pump 13 includes the case body 132 and the pump cover 133, the pump cover 133 is mounted in close contact with the case body 132, the cooling jackets 134 are formed in the pump cover 133, and the second pipe 22 is connected to the cooling jackets 134 of the pump cover 133. Thus, it is possible to readily prevent the temperature of carbon dioxide from rising due to heat generated by a drive source (in this example, the motor of the impeller 131) of the first fluid pump 13. More specifically, vaporization of the liquefied carbon dioxide can be readily suppressed. In the present embodiment, the second pipe 22 is connected to the pump cover 133 mounted to the case body 132, but the second pipe 22 may be connected to another cover removably mounted to a case of the motor to cool the case of the motor by the refrigerant.

Furthermore, the tank 12 includes the tank body 122 and the tank cover 123, the tank cover 123 is mounted in close contact with the tank body 122, the tank cover 123 includes the cooling jackets 124, and the second pipe 22 is connected to the cooling jackets 124 of the tank cover 123. Thus, the carbon dioxide in the tank 12 is readily cooled.

Second Embodiment

Next, a second embodiment will be described with reference to FIG. 4. Of components of the present embodiment, components similar to those of the first embodiment are denoted by the same reference numerals, and the description thereof is omitted.

Figure 4:
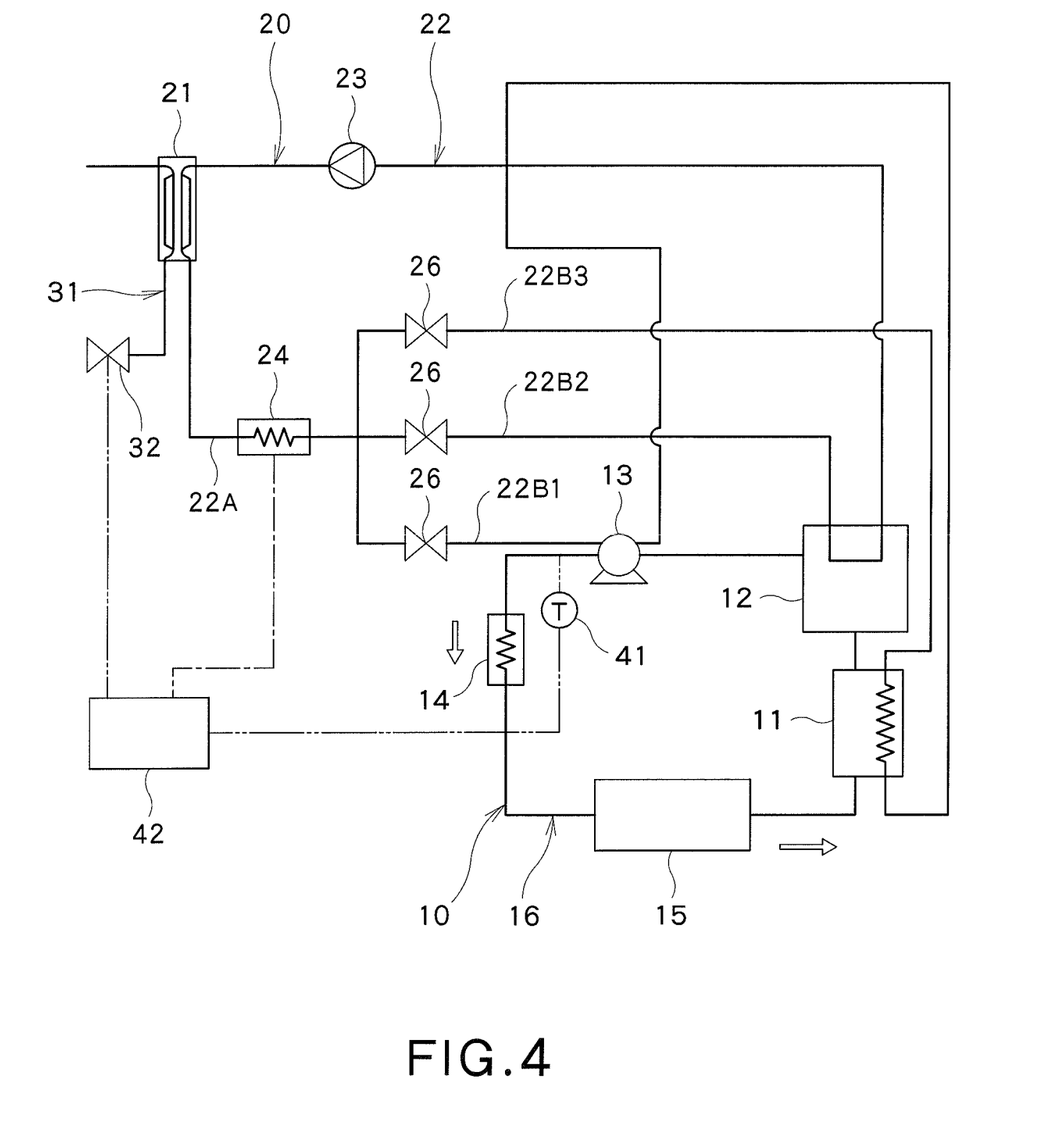
FIG. 4 is a schematic diagram of a fluid supply apparatus according to a second embodiment of the present invention.

As illustrated in FIG. 4, in the present embodiment, the second pipe 22 is branched into a plurality of pipes, specifically three pipes, on the downstream side from the cooler 21 and on the downstream side from the refrigerant heater 24, and branch portions 22B1 to B3 are assigned and connected to the first fluid pump 13, the tank 12, and the heat exchanger 11, respectively. The branch portions 22B1 to B3 return the refrigerant having circulated through the first fluid pump 13, the tank 12, and the heat exchanger 11 to an upstream side from the second fluid pump 23. In other words, the second pipe 22 includes a main flow path portion 22A provided with the cooler 21, the second fluid pump 23, and the refrigerant heater 24, and the three branch portions 22B1 to B3 branching from a downstream end portion of the main flow path portion 22A and merging at an upstream end. The other components have similar configurations to those of the first embodiment.

A flow control valve 26 is provided in each of the branch portions 22B1 to B3. Thus, the flow rate of the refrigerant for cooling each of the first fluid pump 13, the tank 12, and the heat exchanger 11 becomes adjustable, and the degree of cooling in each of the first fluid pump 13, the tank 12, and the heat exchanger 11 is adjustable. These flow control valves 26 are controlled by the controller 42.

The present embodiment enables to readily control the temperature of each of the first fluid pump 13, the tank 12 and the heat exchanger 11 to a desired temperature, and stability in maintaining temperature is increased.

Third Embodiment

Next, a third embodiment will be described with reference to FIG. 5. Of components of the present embodiment, components similar to those of the first or second embodiment are denoted by the same reference numerals, and the description thereof is omitted.

Figure 5:
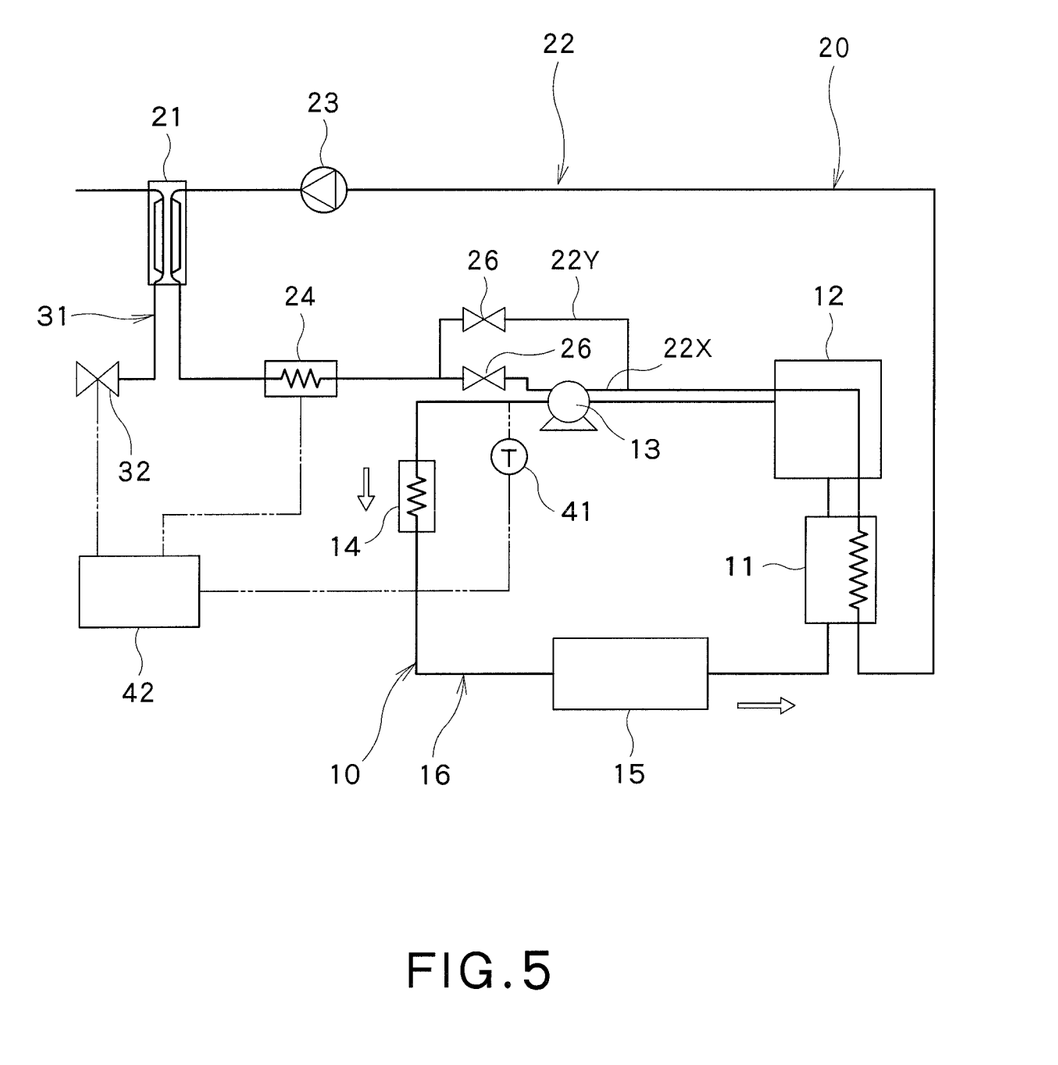
FIG. 5 is a schematic diagram of a fluid supply apparatus according to a third embodiment of the present invention.

As illustrated in FIG. 5, the second pipe 22 according to the present embodiment includes a pump connection portion 22X connected to the first fluid pump 13 so as to cool the carbon dioxide by the refrigerant in the first fluid pump 13, and a pump bypass portion 22Y bypassing the pump connection portion 22X to send the refrigerant downstream without circulating the refrigerant through the first fluid pump 13. Each of the pump connection portion 22X and the pump bypass portion 22Y is provided with the flow control valve 26 that is operable to adjust the flow rate of the refrigerant to be circulated. The other configurations are similar to those of the first embodiment. Note that instead of the flow control valve 26, an on-off valve that switches only opening and closing may be provided.

According to the present embodiment, provision of the on-off valve or flow control valve in the pump connection portion 22X and/or the pump bypass portion 22Y enables adjustment of presence/absence of cooling the first fluid pump 13 or refrigerating capacity to the first fluid pump 13.

Fourth Embodiment

Next, a fourth embodiment will be described with reference to FIG. 6. Of components of the present embodiment, components similar to those of the first to third embodiments are denoted by the same reference numerals, and the description thereof is omitted.

Figure 6:
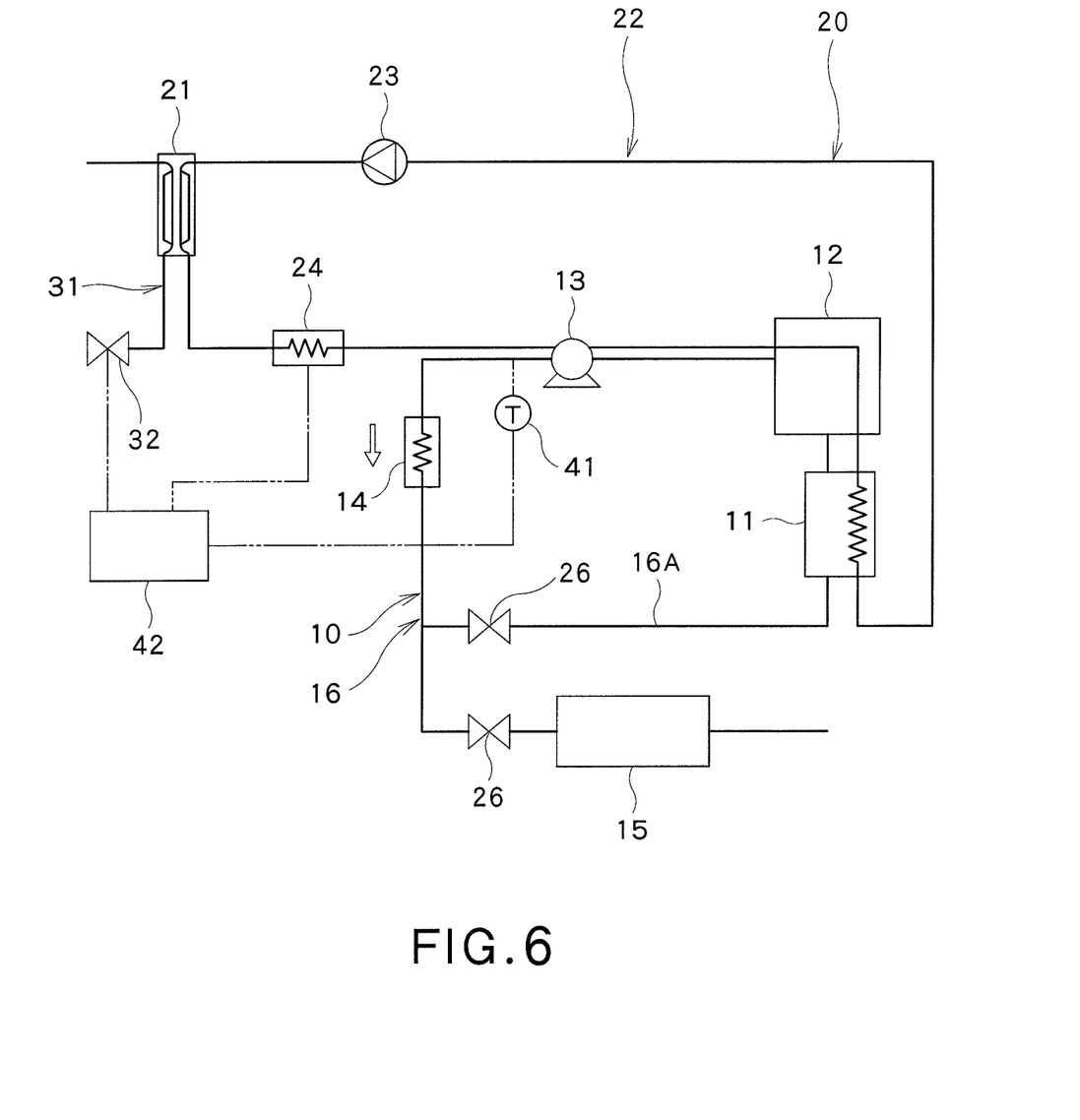
FIG. 6 is a schematic diagram of a fluid supply apparatus according to a fourth embodiment of the present invention.

As illustrated in FIG. 6, the first fluid circulation device 10 according to the present embodiment is switchable between a state in which supercritical carbon dioxide fluid is supplied from the heater 14 to the first fluid supply unit 15 and a state in which the heater 14 causes supercritical carbon dioxide fluid to flow out to the heat exchanger 11 with no supply of the supercritical carbon dioxide from the heater 14 to the first fluid supply unit 15. More specifically, unlike the embodiments described above, the flow control valve 26 is provided between the heater 14 and the first fluid supply unit 15 in the first pipe 16. In the first pipe 16, the first fluid supply unit 15 has a downstream end portion not connected to the heat exchanger 11. Meanwhile, a branch pipe 16A extends from between the flow control valve 26 and the heater 14 in the first pipe 16, a flow control valve 26 is also provided in the branch pipe 16A, and the branch pipe 16A has a downstream end portion connected to the heat exchanger 11. In this configuration, the two flow control valves 26 are caused to appropriately open and close to enable switching as described above. According to the present embodiment, the same effects as those of the first embodiment can be obtained as well.

Although the embodiments of the present invention have been described above, the present invention is not limited to the above-described embodiments. Various omissions, substitutions, and changes in the form of the embodiments described above may be made without departing from the spirit of the inventions.

In the embodiments described above, for example, the second pipe 22 through which the refrigerant is caused to circulate is connected to the first fluid pump 13, the tank 12, and the heat exchanger 11, but the second pipe 22 may only be connected to one of the first fluid pump 13 and tank 12 and the heat exchanger 11. Furthermore, the position of the second fluid pump 23 or refrigerant heater 24 in the second pipe 22 is not limited to the above descriptions of the embodiments. For example, the second fluid pump 23 may be provided downstream from the cooler 21.

Figure 7:
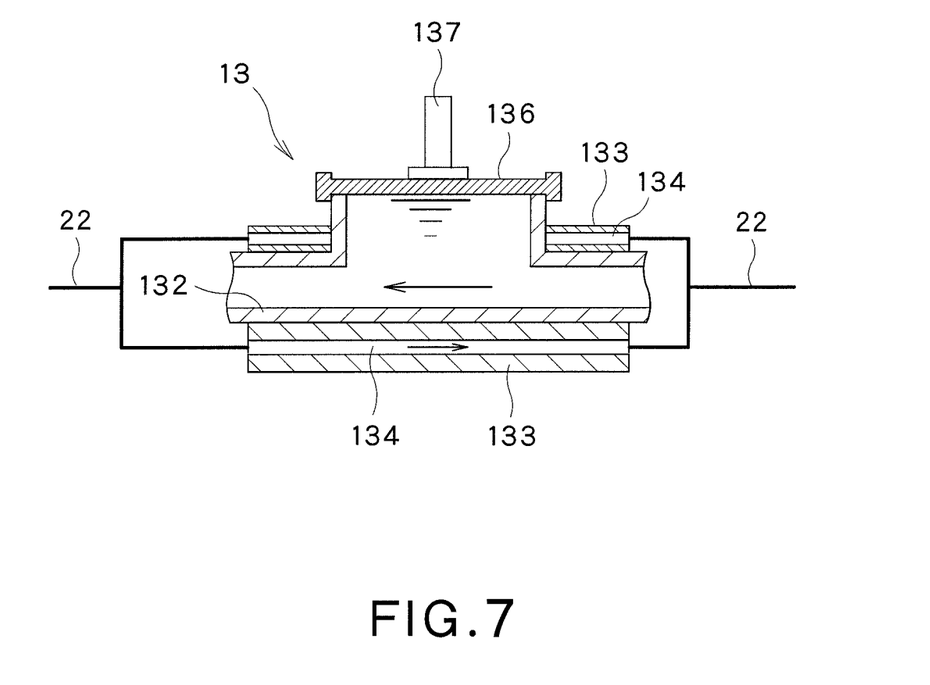
FIG. 7 is a diagram illustrating a modification of the first embodiment.

Furthermore, as described above, the first fluid pump 13 described in the first embodiment may include the diaphragm pump, and a cross-sectional view of the first fluid pump 13 according to such a modification is illustrated in FIG. 7. In this configuration, a diaphragm 136 is mounted to the case body 132, the diaphragm 136 is pressed and pulled by a plunger 137, and the carbon dioxide fluid flows through the case body 132. In the present modification, the pump cover 133 is removably mounted to the case body 132 so as to avoid the diaphragm 136. As indicated by an arrow in the figure, the refrigerant flowing from an upstream portion of the second pipe 22 to a downstream portion of the second pipe 22 through the cooling jacket 134 flows in a direction opposite to a direction in which the carbon dioxide flows.

The invention claimed is:

1. A fluid supply apparatus comprising:
a first fluid circulation device including: a heat exchanger that cools and liquefies a first fluid; a tank that stores the first fluid liquefied by the heat exchanger; a pump that pumps the first fluid stored in the tank; a heater that heats the first fluid pumped from the pump; a first fluid supply unit that receives the first fluid supplied from the heater; and a first pipe that connects the heat exchanger, tank, pump, heater, and first fluid supply unit to each other, wherein the first fluid having been supplied to the first fluid supply unit is caused to flow out to the heat exchanger or flow of the first fluid is switchable between a state in which the first fluid is supplied from the heater to the first fluid supply unit and a state in which the heater causes the first fluid to flow out to the heat exchanger with no supply of the first fluid from the heater to the first fluid supply unit; and
a second fluid circulation device including: a cooler that cools a second fluid; and a second pipe that causes the second fluid having been cooled by the cooler to circulate and returns the second fluid to the cooler,
wherein the pump is separate from the tank and is located downstream of the tank on the first pipe;
wherein the second pipe of the second fluid circulation device is connected to the heat exchanger and is connected to the tank and the pump, and the second fluid circulation device causes the second fluid and the first fluid to exchange heat with each other in the heat exchanger to cool the first fluid, and causes the second fluid and the first fluid to exchange heat with each other in the tank and the pump to cool the first fluid,
wherein the first fluid is carbon dioxide, and the first fluid circulation device is configured to boost the pressure of the first fluid by the pump and heat the first fluid by the heater to generate a supercritical carbon dioxide fluid.

2. The fluid supply apparatus according to claim 1, wherein the second pipe causes the second fluid to circulate through the pump, the tank, and the heat exchanger in this order.

3. The fluid supply apparatus according to claim 1, wherein the second pipe includes a pump connection portion connected to the pump so as to cool the first fluid by the second fluid in the pump, and a pump bypass portion bypassing the pump connection portion to send the second fluid downstream without causing the second fluid to circulate through the pump.

4. The fluid supply apparatus according to claim 1, wherein
the pump includes a case body and a pump cover, the pump cover is mounted in close contact with the case body, and the pump cover includes a cooling jacket, and
the second pipe is connected to the cooling jacket of the pump cover.

5. The fluid supply apparatus according to claim 1, wherein
the tank includes a tank body and a tank cover, the tank cover is mounted in close contact with the tank body, and the tank cover includes a cooling jacket, and
the second pipe is connected to the cooling jacket of the tank cover.

6. The fluid supply apparatus according to claim 1, wherein the second fluid is an ethylene glycol solution, an alcohol-based antifreeze, or a fluorine-based refrigerant.

7. The fluid supply apparatus according to claim 6, wherein the second fluid circulation device includes a second fluid heater that heats the second fluid cooled by the cooler, and the second pipe is connected to the heat exchanger, the tank, and the pump on a downstream side from the second fluid heater, the apparatus further comprising:
a temperature sensor that detects a temperature of the first fluid in a portion downstream from the pump and upstream the heater in the first pipe; and a controller that adjusts a heating amount of the second fluid heater on the basis of a result of detection by the temperature sensor.

* * * * *